United States Patent [19]
Rothschild

[11] Patent Number: 6,101,534
[45] Date of Patent: Aug. 8, 2000

[54] INTERACTIVE, REMOTE, COMPUTER INTERFACE SYSTEM

[76] Inventor: Leigh M. Rothschild, 777 Brickell Ave. #1112, Miami, Fla. 33131

[21] Appl. No.: 08/922,926

[22] Filed: Sep. 3, 1997

[51] Int. Cl.[7] .............................. G06F 13/38; G06F 15/17
[52] U.S. Cl. .......................... 709/217; 709/219; 709/225; 709/229
[58] Field of Search ..................................... 709/217, 218, 709/219, 225, 228, 229; 713/201; 340/825.34

[56] References Cited

U.S. PATENT DOCUMENTS

| | | | |
|---|---|---|---|
| 4,672,572 | 6/1987 | Alsberg . | |
| 5,694,546 | 12/1997 | Reisman . | |
| 5,805,442 | 9/1998 | Crater et al. | 709/219 |
| 5,922,045 | 7/1999 | Hanson | 709/228 |

OTHER PUBLICATIONS

Heylighen, F.;"World–Wide Web: a distributed paradigm for global networking"; Proceeding SHARE Europe Spring Conference; pp. 355–368; Apr. 18, 1994.

Igbal, MS et al.; "A Simplied and an Efficient Packet Level Internet Access Control Scheme"; ICCS/ISITA '92; Singapore; IEEE Publications; 1992; pp. 963–967.

*Primary Examiner*—Mark H. Rinehart
*Attorney, Agent, or Firm*—Malloy & Malloy, P.A.

[57] ABSTRACT

An interactive, remote, computer interface system having a remote server assembly including a quantity of primary site data and at least one primary site address that contains at least a portion of the primary site data and is distinct so as to identify a location thereof on a computer network. The system further includes a local processor assembly coupled in data transmitting and receiving communication with the remote server assembly and structured to access the primary site address so as to achieve the data transmitting and receiving communication with the remote server assembly. At least one data storage assembly is associated with the local processor assembly and contains a quantity of auxiliary site data thereon, the auxiliary site data being associated with the primary site data. Further the data storage assembly including a compact, portable and interchangeable computer readable medium having a plurality of remotely accessible, auxiliary site addresses encoded therein, each of said remotely accessible, auxiliary site addresses including select portions of the quantity of auxiliary site data, and being structured to be remotely accessed by the remote server assembly so as to initiate utilization of select portions of the auxiliary site data by the local processor assembly in conjunction with the primary site data.

22 Claims, 1 Drawing Sheet

INTERACTIVE, REMOTE, COMPUTER INTERFACE SYSTEM

BACKGROUND OF THE INVENTION

1. Field of the Invention

The present invention relates to an interactive, remote, computer interface system preferably used with a real estate display system structured to permit the remote exhibition of a real estate space, whether the real estate space if fully constructed or in a planning stage, and in a manner which gives a substantially realistic and comprehensive demonstration of the real estate space, either for prospective purchase purposes or for directional and guiding purposes.

Further, the system provides selectivity between self-contained, on-site display and program generation, and remotely accessed display, the system being structured such that even in a remotely accessed display substantially real time, continuous movement, inter-activity and image generation is achieved through the utilization of a specific interactive, remote computer interface system. The interface system itself relates to a system of substantially enhancing the effectiveness of interactive "online" capabilities, especially as they relate to video and audio.

2. Description of the Related Art

Real estate sales and development is a multi-million dollar industry based on the impact and appealability of a particular real estate space to a prospective consumer. While in many circumstances, an actual real estate space which is being offered is physically available for a preferred, personal "walk-through" by a prospective purchaser or investor, sometimes such circumstances are not available or are not practical. For example, if a purchaser or investor is at a location remote from the precise real estate space, it may be inconvenient and time consuming for that individual to make a special trip just to view one or more specific real estate spaces. Along these lines, if a number of real estate spaces are to be viewed, a substantial amount of time is spent merely travelling from one location to another, and a viewer is never truly able to make a comparison while the images are fresh in his/her mind. Moreover, and perhaps of even more significant, especially in the field of real estate development, a particular real estate space may not be physically available for viewing because it is still under construction or is in the developmental stages. In such a circumstance, prospective purchasers or investors must rely on static artist sketches of a particular real estate space, or must view a similar real estate space. Unfortunately, these methods and existing systems do not truly provide a prospective purchaser or investor with a realistic perspective of a specific real estate space.

For example, even with existing video systems, a prospective purchaser or investor is not truly able to capture the feel of user controlled, independent movement from one room to another or of exploring the surrounding environment of the real estate space, such as examining a specific view from a window or balcony, and exploring options relating to elevation and orientation changes of a particular real estate space. As such, it would be highly beneficial to provide a system which can provide a prospective purchaser or investor a complete and highly realistic view of a specific real estate space, even when direct viewing of the real estate space is not available for any of a variety of reasons.

With the advent of technology, more and more individuals have sought to develop technical systems to provide some sort of representation of the view of real estate space. While a depiction of floor plans and artist drawings may sometimes be available, most systems which claim to be interactive merely provide a series of fixed dimension and orientation, static images strung together. Indeed, any systems which claim to provide a user with a "walk-through" type viewing environment are typically very limited in the views which they provide, are substantially erratic, as they do not seek to provide any image continuity beyond merely stringing static images together, and typically only provide a moving reference point for viewing the same image rather than providing a user with an actual feel for a specific real estate space. In fact, these systems are truly linear displays of files on a video tape or laser disc, and provide no user interactivity, indeed, a user of conventional systems is merely permitted to "sit and watch" without control, beyond conventional forward, rewind and/or selection of a file to be displayed.

As such, it would be highly beneficial to provide a real estate display system which can provide a user with a highly interactive, first person perspective, "walk-through" type experience, giving the user complete freedom of mobility so as to turn around, look up, down or at any location desired, substantially giving that user the impression of an actual presence in the real estate space. Moreover, such a system should be capable of interlacing audio and video information regarding the specific real estate space, such as views from a balcony or a window, and/or presentations regarding options, such as different flooring or wall coverings, or other amenities so as to anticipate views a user at the actual space would normally seek to see, and indeed, providing some views and information which could not be as readily available in a standard, physical "walk-through".

In addition to the needs associated with the sale and demonstration of a specific real estate space to prospective purchasers, it is also seen that significant needs are associated with the requirements of individuals attempting to navigate large, complex real estate spaces, such as office buildings, cruise ships, collage campuses, recreational facilities, hospital facilities, convention centers and the like. In such circumstances, and often because of the generally limited display space available for directional/navigational information, individuals seeking to navigate a specific real estate space must generally rely upon two dimensional maps to provide some maneuvering guidance. Such maps, however, do not provide any true frame of reference for an individual attempting to navigate a specific area, such as by pointing out landmarks and generally providing an individual with the knowledge of "what they are looking for" as they actually proceed through the real estate space. Along these lines, it would be highly beneficial to have a system for the display of real estate space which can effectively and realistically guide an individual through a large complex real estate space, providing that individual with substantially realistic and accurate representations of what that individual will see as they seek to arrive from one location to another. Moreover, such a system should be capable of providing additional and immediate information regarding particular locations, sites, or points of interest along the way, thereby further assisting the individual in their navigation through the real estate space. Although a typical map display should also be available for such a system, it would be beneficial to provide some reference between that typical map display and an actual first person image of what will be seen as certain areas are navigated, allowing the user complete control and freedom of movement in order select a location to which they would seek to go and a manner in which they would like to arrive at that location, while still providing a complete and accurate representation of the navigation course. Unfortunately, the prior art is deficient in providing such a system capable of achieving such result and providing such effective information to an individual seeking to navigate or otherwise view a real estate space. Moreover, such system are pre-set in the guided path and do not let an individual explore and/or select their own path that guides them by other desired locations and can provide information regarding unfamiliar locations at the users option. Indeed, the system of the present invention uniquely seeks to provide an effective, accurate and easy to use solution to the problems which remain in the related art.

Furthermore, it is noted that with the advent of on-line technology, such as internet navigation, it is often desirous for various types of information, including real estate space display information, to be accessed through a remote on-line connection. Such types of connections are indeed quite valuable as they enable large quantities of information to be stored on dedicated remote server assemblies, permitting individuals, with perhaps less powerful computer systems to access the vast array of information. A significant problem associated with the use of such on-line technology, however, involves the substantial amount of time required to download various images and information. Such is particularly the case with any kind of animated three dimensional images or with video and/or audio information. Typically, the download time for such types of information is in the range of many minutes, making any kind of seamless and/or continuous presentation of an animated nature substantially impossible. Indeed, even with the advent of broadband technology and higher speed computers, substantial limitations still exist with regard to the speed in which video and audio is provided in an accessible and effectively utilizable means for a person at a local access site. Accordingly, it would be highly beneficial to provide a system which is capable of substantially, easily and economically, but significantly enhancing the interactive capabilities of an on-line "web" site, especially in the field of continuous motion video or graphical displays, and extensive audio signals associated with those displays. Furthermore, such a system should not violate the security requirements commonly associate with internet technology by unnecessarily accessing information stored on a user's computer hard-drive and/or other sensitive areas. The system should also be capable of seamlessly and quickly providing a variety of supplemental and auxiliary information, which can significantly enhance the on-line experience, by achieving sophisticated and generally lengthy audio and video segments without the requisite, extended down-load times, and in a manner which can be effectively interactive and modifiable during display.

SUMMARY OF THE INVENTION

The present invention is directed towards a real estate display system for the remote exhibition of real estate space, such as for purposes of display and purchase, or for purposes of assisting navigation and/or demonstration of the physical space to one or more individuals. Specifically, the display system of the present invention includes a display assembly structured to visually display a three-dimensional image thereon, and having the capabilities to display continuous motion images such as video or continuous three dimensional graphics, audio and animated files.

Further, the display system of the present invention includes a data storage assembly. The data storage assembly is structured to store a quantity of data corresponding the plurality of three dimensional images which may be displayed on the display assembly. Of course, the plurality of three dimensional images are preferably directly associated with the real estate space to be displayed by the display system. To be used at least partially in conjunction with the data storage assembly, the display system also includes a data entry assembly. Specifically, the data entry assembly of the present display system is structured to at least partially input the quantity of data corresponding the three dimensional images into the data storage assembly.

The system of the present invention further includes a processor assembly, the processor assembly including preferably both an overlay processor and a direct view processor as a part thereof. In particular, the overlay processor is structured to generate a floor plan display of the three dimensional/real estate space. This floor plan display is generated from the quantity of data contained at least in part by the data storage assembly, with the floor plan display being structured for display on the display assembly in preferably complete form. Conversely, the direct view processor is structured to generate a three dimensional, walk-through display of the three dimensional space. The three dimensional walk through display is generated by the direct view processor from the quantity of data corresponding the plurality of three dimensional images and is structured to generate and provide a substantially realistic, first person illustration of the real estate space to be displayed on the display assembly. While both the three dimensional, walk-through display and the floor plan display may be shown on the display assembly at the same time, the display system preferably includes a display selection means. The display selection means are structured to selectively display the three dimensional display and/or the floor plan display on the display assembly according to the specific needs of the user. As such, the display selection means is structured to control the switching between displays, preferably at any time desired by the user.

In order to facilitate maneuvering and movement throughout one or more of the various displays, the present system further includes a reference beacon. The reference beacon is structured to be recognized by the processor assembly and to thereby direct the processor assembly to generate and display a particular portion of a selected one of the displays. That particular portion of the selected display is structured to specifically correspond a spacial position and spacial attitude of the reference beacon, thereby allowing control and modification of the spacial position and attitude of the reference beacon to likewise control the display generated for depiction on the display assembly. To assist this function, the present display system includes an attitude control assembly. The attitude control assembly is structured to selectively change the spacial attitude of the reference beacon generally along vertical and horizontal plains, thereby allowing a user to effectively "look" up and down, left and right, and/or any combination thereof. Similarly, a position control assembly is provided. The position control assembly is structured to selectively change the spacial position of the reference beacon relation to the portion of the display being generated by the processor assembly and being shown on the display assembly. Such a position control assembly effectively provides for movement throughout a specific, select display being generated and shown. Along these lines, the processor assembly is specifically structured to substantially continuously and seamlessly modify the portion of the display being generated thereby and being displayed on the display assembly. These continuous modifications correspond those changes in the spacial position and spacial attitude of the reference beacon and thereby provide realistic transitions between the viewing of a particular area to the viewing of another particular area as directed by the user. Also, the processor assembly is structured to continuously correlate the spacial position of the reference beacon in the three dimensional walk-through display with its spacial position in the floor plan display, and vise-a-versa. As such, by coordinating the spacial positions with one another and also preferably by coordinating a horizontal spacial attitude, when the display selection means switch between the displays, the portion of the display being shown on the display assembly, whether the three dimensional, walk-through display or the floor plan display will always remain consistent. Such correlation allows effectively toggling between the various displays, and/or permits simultaneous illustration of both displays in order to provide a more effective overall picture of a specific real estate space being viewed thereby.

Additionally, the present invention relates to an interactive, remote computer interface system which enables the utilization of the real estate display system through an "online" medium. Preferably, the interface system of the present invention includes a remote server assembly which contains quantities of primary site data. Moreover, the remote server assembly also includes at least one primary site address in which at least a portion of the primary site data is stored. Preferably, that primary site address is distinct and unique, thereby identifying a particular location thereof on a computer network, and allowing remote access to that primary site address from another location.

Additionally, the interface system includes a local processor assembly, such as the processor assembly of the real estate display system. The local processor assembly and the remote server assembly are connected in data transmitting and receiving communication with one another, such as through a typical on-line connection. Moreover, the local processor assembly is structured to access the primary site address in order to achieve the data transmitting and receiving communication with the remote server assembly, and in particular, so as to be able to access the primary site data contained at the primary site address.

The local processor assembly further includes at least one data storage assembly associated therewith. While the data storage assembly may include only a fixed/hard drive of the local processor assembly, preferably the data storage assembly of the interface system includes at least one compact, portable and interchangeable computer readable medium. This interchangeable computer readable medium is structured to contain a quantity of auxiliary site data thereon, that auxiliary site data being associated with the primary site data. Furthermore, the interchangeable computer readable medium preferably includes a plurality of remotely accessible, auxiliary site addresses encoded therein. Each of the auxiliary site addresses includes a select portion of the quantity of auxiliary site data and is structured to be remotely accessed by the remote server assembly. The remote access by the remote server assembly is structured to initiate utilization of the select portions of the auxiliary site data by the local processor assembly, preferably in conjunction with the primary site data and in a manner which is continuous and well integrated. In this regard, and relating to the preferred embodiment wherein the local processor assembly is utilized as part of a real estate space display system, the auxiliary site data may include a plurality of operating instructions which will work in conjunction with a quantity of data, such as the auxiliary site data stored on the interchangeable computer readable medium or other stored data, in order to instruct the local processor assembly to generate various display images, such as a three dimensional display or overlay display. In this manner, a user at the local processor assembly need not wait for the downloading of substantial quantities of information and images in order to provide a substantially interactive, continuous and effective display on the display assembly associated therewith.

It is an object of the present invention to provide a display system capable of giving a user a true and complete perspective of a specific three dimensional space, such as a real estate space.

A further object of the present invention is to provide a display system wherein a display image is continuously updated to provide seamless movement in a three dimensional environment.

Also an object of the present invention is to provide a display system which is structured to have various quantities of video and audio information readily available for immediate utilization so as to enhance the display experience and provide further information to a user.

Yet another object of the present invention is to provide a display system capable of effectively and interactively guiding a user through a large real estate space, such as a cruise ship, a college campus, a factory, an office complex, a hospital, a recreational facility, and the like.

Still another object of the present invention is to provide a display system capable of guiding a user through a large real estate space in a manner which permits the user to define a desired path as they are being guided through the space, and which makes additional information regarding specific areas readily available to the user in an effective format such as full motion video.

Another object of the present invention is to provide a display system capable of providing furnished and unfurnished images of an area being displayed, and selective elevations and corresponding views from the selected elevations.

An added object of the present invention is to provide a display system capable of permitting a user to selectively choose a variety of options, such as different floor and wall coverings, and thereby obtain a more complete image of their preferred version of the real estate space.

A further object of the present invention is to provide a display system which can be utilized through an on-line connection, in connection with a remove server assembly, so as to provide substantially updated information and an interactive display without excessive down-load time delays.

An added object of the present invention is to provide an interface system wherein a user is able to access a remote server assembly and can view and utilize graphical images, video images and audio signals of substantially volumes, in a rapid, real-time basis without extensive down-load times, but in a manner which is substantially interactive with the information provided at the remote server assembly.

Also another object of the present invention is to provide a computer interface system which substantially enhances the capability of a website by permitting the effective, coordinated utilization of high content data such as full motion video.

Also an object of the present invention is to provide a computer interface system which is capable of being remotely upgraded, either through an on-line connection or other transmission type connection, and can contain a substantial quantity of information in a readily and effectively usable manner.

A further object of the present invention is to provide a computer interface system which substantially enhances the display capabilities of a remote site, but which does not violate security protocols regarding remote access to a local processor assembly.

Another object of the present invention is to provide a computer interface system which substantially enhances the display capabilities of a remote site in a substantially seamless and continuous manner regardless of the remote or local location of the data being utilized and or displayed.

These and other objects will become apparent upon reviewing the following detailed description and recited claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
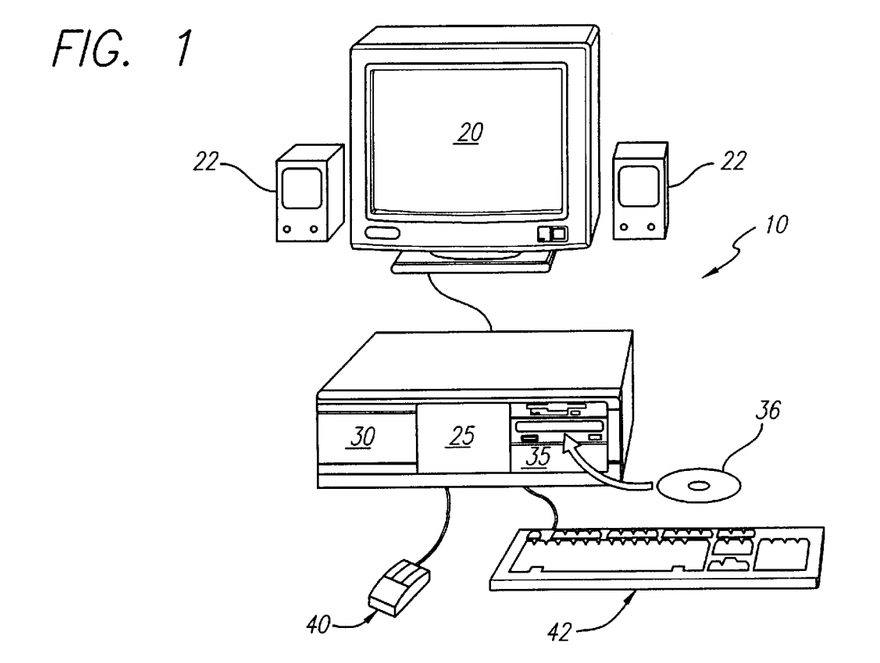
FIG. 1 is a schematic of the system for the display of a three dimensional space of the present invention in its preferred embodiment.
Figure 2:
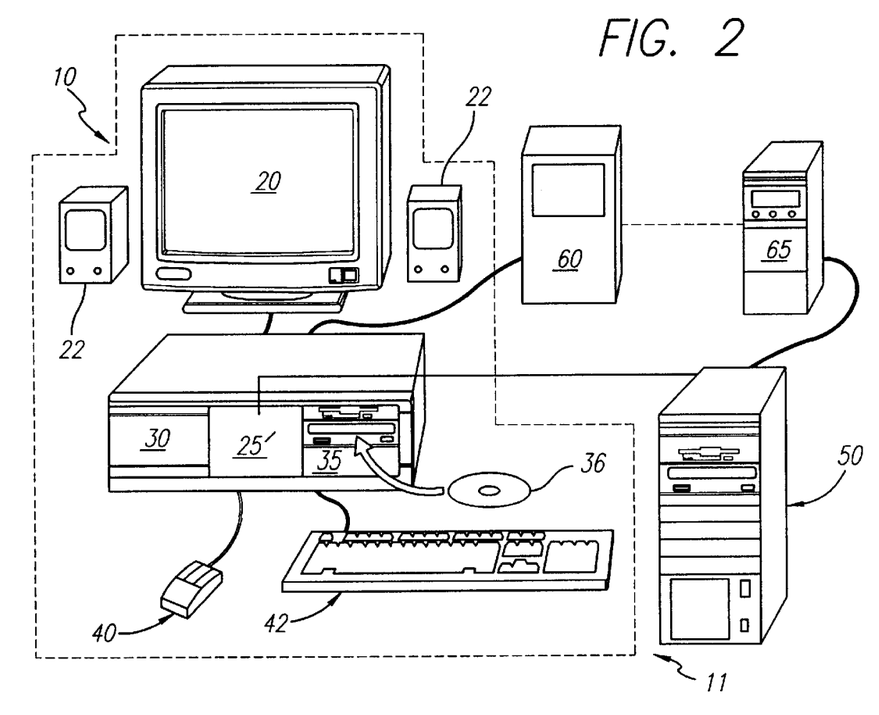
FIG. 2 is an alternative embodiment of the system for the display of a three dimensional space, and included as part of an interactive, remote, computer interface system.

Shown in schematic throughout the Figures, the present invention is directed towards a system for the display of a three dimensional space, generally 10, and preferably, a real estate display system 10 structured to provide for the remote exhibition of real estate space. Specifically, the real estate space may be any physical space such as a home, apartment, resort, university, cruise ship, office, retail plaza, stadium, arena or any other physical space wherein it would be beneficial for a user to view and/or identify and locate various areas from a single location. Indeed, such a display system 10 is structured to effectuate the display of a real estate space, even before it is built and at any remote location near or far from the actual location of the real estate space, all in a substantially clear, interactive, precise and effective manner.

The display system 10 of the present invention includes a display assembly 20. The display assembly 20 may include a computer monitor, television monitor, or any other type of video or graphic display type assembly. Moreover, the display assembly 20 will preferably have substantially high color resolution so as to significantly enhance the realism and clarity of three dimensional images which the display assembly 20 is structured to visually display thereon.

Further includes as part of the display system 10 is at least one data storage assembly 30. Preferably, the data storage assembly 30 includes a computer readable medium, and in the preferred embodiment of FIG. 1 preferably includes a computer hard drive or other fixed data storage assembly wherein a large quantity of data may be stored and contained. As will be described in further detail subsequently, however, the data storage assembly may also include portable and/or interchangeable assemblies such as compact discs or other such writable and non-writable assemblies and the accompanying drives. Preferably, the data storage assembly 30 is structured to store a substantial quantity of data corresponding a plurality of the three dimensional images which the display assembly 20 is capable of visually displaying thereon. Furthermore, those three dimensional images associated with that quantity of data are preferably also associated with the real estate space to be exhibited by the display system 10. Along these lines, it is noted that a variety of different real estate spaces may be visually exhibited by the same display system 10, however, for purposes of clarity, the following discussion will focus on a display system including only a single real estate space to be displayed thereby.

In order to at least partially input the quantity of data corresponding the plurality of three dimensional images of the real estate space into the data storage assembly 30, the display system further includes a data entry assembly. Indeed, the data entry assembly can take on any of a number of conventional configurations such as a computer keyboard 42, a down-loadable computer readable medium 36, such as a compact disk or tape, and indeed may include a transmitter/receiver type connection 60 wherein data is down-loaded utilizing the data entry assembly into the data storage assembly 30 from a remote site.

The display system 10 of the present invention further includes a processor assembly, generally 25. The processor assembly 25 preferably includes a computer CPU capable of manipulating a quantity of data and generating/rendering the necessary displays. Of course, a generally higher power, high speed computer is preferred, as such will enhance the effectiveness of the display system 10 of the present invention. In the display system 10 of the present invention, the processor assembly 25 is seen to incorporate at least a direct view processor, but preferably both a direct view processor and an overlay processor, each of which is structured to generate separate and distinct images for display on the display assembly 20. Of course, it is noted that a single processor assembly 25 is preferably utilized and is structured to perform the function of both the overlay and the direct view processor.

Looking first to the overlay processor, it is structured to generate a floor plan display of the three dimensional space utilizing the quantity of data stored in the data storage assembly 30. The floor plan display will preferably be a conventional map-type display of a specific real estate space, thereby substantially easily providing a user with an overall perspective of their viewing location relative to other locations of the real estate space being displayed. Conversely, the direct view processor is structured to generate a three dimensional, walk-through display of the three dimensional space utilizing the quantity of data that corresponds the three dimensional images. Specifically, the direct view processor incorporates a series of three dimensional images and provides for continuous updating and modification and seamless transitions from a particular portion of the three dimensional display to other portions of the three dimensional display. Such a direct view processor typically incorporates a three dimensional, graphic image build engine, such as that which may be utilized in some of the more modern three dimensional gaming technology, with the added enhancements of inter-activity with the floor plan display and various other informational and accessory items as will be subsequently described.

Although both the floor plan display and the three-dimensional "walk-through" display may be simultaneously illustrated and depicted on the display assembly 20, such as through an allocation of available screen space, it is preferred that only a single one of the displays be shown at one time on the display assembly 20. In that regard, the display system 10 of the present invention further includes display selection means. Specifically, the display selection means are structured to direct the processor assembly to selective display the three dimensional display or the floor plan display on the display assembly 20, providing any necessary and desired switching therebetween. Along these lines, the display selection means may include any effective means so as to indicate to the processor assembly 25 that either or both of the displays should be generated and shown on the display assembly 20. As such, the display selection means may incorporate a computer keyboard 42, mouse 40, joy stick, voice activated control assembly, touch screen, or any other available switching indicator that permits a user to effectively select the display options provided by the display selection means for use by the processor assembly.

In order to effectuate movement through the depicted real estate space, the display system 10 of the present invention further includes a reference beacon. The referenced beacon may be a computer generated character or condition, and is specifically structured to be recognized by the processor assembly 25 in order to direct the processor assembly 25 to generate and display a specific, selection portion of a selected one of the displays to be shown on the display assembly 20. For example, in the three dimensional display, the reference beacon is preferably not visible and provides a first person perspective that is structured to control the portion of the display being shown on the display assembly 20 to correspond a specific spacial position and spacial attitude thereof. In other words, the reference beacon enables a user to specifically select where they are "looking" and to accordingly modify the portion of the display being generated by the processor assembly 25 and displayed on the display assembly 20 to correspond that portion. In the case of the floor plan display, it is noted that the reference beacon is preferably visible as a generated character on the display assembly 20 and may provide some sort of directional indication, such as an arrow or the like, to indicate specifically the spacial position and horizontal spacial attitude thereof. Moreover, in this regard, as it is preferred that the entire floor plan display be viewed at one time so as to provide an overall view of the real estate space, it is also noted that for larger real estate spaces only portions thereof may be shown at one time, those portions also corresponding and being directed by the reference beacon.

In order to selectively change the spacial attitude of the referenced beacon, the display system 10 preferably includes an attitude control assembly. In particular, the attitude control assembly preferably modifies the spacial attitude of the reference beacon along both vertical and horizontal planes, thereby effectively permitting a user to look up, down, left, right or any combination thereof, as desired, by correspondingly changing the portion of the three dimensional display being shown to correspond those modifications in the spacial attitude of the reference beacon. While the attitude control assembly may take on any of a variety of different configurations, and may indeed be a single control item, depending upon its capabilities, in a preferred embodiment, it is seen that the attitude control assembly includes a mouse 40 or keyboard assembly 42 for modifications along the horizontal plain, and a keyboard 42 or joy-stick to indicate adjustment along a vertical plain. Of course, any combination of such control assemblies may be effectively utilized so as to incorporate a full range of spacial attitude modification and re-orientation.

Similarly, the display system 10 includes a position control assembly. The position control assembly is structured to selective change the spacial position of the reference beacon relative to the portion of the display being generated by the processor assembly 25 and being displayed on the display assembly 20. In this regard, the position control assembly generally controls movement through the display and may include specific directional controls so as to provide for movement in any select direction, or may merely provide for forward or reverse movement corresponding the spacial attitude of the reference beacon. From the foregoing, however, it is noted that the processor assembly 25 is specifically structured to substantially continuously modify the portion of the display being generated thereby and being displayed on the display assembly 20 to correspond even small changes in the spacial position and the spacial attitude of the reference beacon, which are being dictated through the attitude control assembly and position control assembly by a user. As a result, a user is able to effectively "move" through the displayed real estate space, can look at any specific location as desired, and is not limited merely to static and select displays and vantage points "scrolling" by. Indeed, if desired, the processor assembly 25 may be specifically structured to provide one or more elevated or modified room displays of a particular room of the real estate space being displayed if the user desires an alternative look or an elevated complete room perspective rather than the first person perspective which is preferably displayed and generated by the direct view processor assembly. Moreover, it is also noted that so as to facilitate interchangeability between the floor plan display and the three dimensional display, the processor assembly 25 is further structured to correlate the spacial position of the reference beacon in the three dimensional display with the spacial position of the reference beacon in the floor plan display, thereby always ensuring that the precise spacial position and attitude is maintained whether or not the display is switched between the varying displays to be shown on a display assembly 20 and no matter what portion of the real estate space is being shown.

The processor assembly 25 of the display system 10 of the present invention, and especially the direct view processor, is also preferably structured to selectively generate and display three dimensional furnishing depictions and other fixture type items in preferred and/or modifiable locations of the depicted real estate space. For example, in the case of an interior real estate space being shown for prospective purchase, it may be beneficial to illustrate to a user what the specific real estate space looks like empty and/or to incorporate one or more select furnishing depictions to provide an idea of upgrades or a complete look. In this regard, the display system 10 of the present invention is preferably structured to selectively display those furnishing depictions, thereby allowing a user complete choices as to specific preferences. Moreover, if desired, specific dimensions of rooms or particular areas can be indicated, either when the furnishing depictions are not being displayed, or at all times in the floor plan display, depending on the particular needs of a user. Further, it is noted that the processor assembly 25 in addition to displaying the three dimensional furnishing depictions in association with a particular portion of the three dimensional display being generated and shown on a display assembly, also functions to maintain those furnishings and depictions in a fixed relative position upon the continuous modification of the portion of the display being generated by the processor assembly 25 and shown as a result of movement of the reference beacon. In this regard, the furnishing depictions are also substantially three-dimensional depictions as a reference perspective to those furnishing depictions will also be modified when a new portion of the display is generated and shown on the display assembly 20 in accordance with movements of the reference beacon. Also, if desired, the furnishing depictions may also include a variety of different types and styles of floor coverings (i.e. tile, wood floors, carpet, etc.) and wall coverings (i.e. wall paper, paint, curtains, blinds, etc.) in one or more select colors and patterns. This will allow a user to truly tailor the look to their needs or preferences.

As yet another feature of the present invention, the direct view processor assembly is also preferably structured to render window view images associated with the portion of the three dimensional display being generated by the processor assembly 25 and being displayed on the display assembly 20. Indeed, as a particular interior real estate space is being shown, windows, such as conventional windows or sliding glass doors, or even balcony areas have exterior views associated therewith. The processor assembly 25 of the present invention is structured to render and indicate those exterior views associated with that portion of the display being shown, and to correspondingly change the appearance of the exterior view in accordance with changes in perspective, as dictated by movement of the reference beacon and depiction of a new portion of the display on the display assembly 20. Along these lines, and especially for multi-story real estate spaces, the processor assembly 25 is preferably structured to selectively modify the window view image to correspond a selected elevation or location of the three dimensional space. As such, a person viewing, for example, a condominium, is able to effectively view a particular real estate space and the expected views to be achieved therefrom depending upon a particular location of that area within the overall real estate space, such as at higher or lower elevations or facing north, south, east or west.

Upon the generation and display of the window view areas, but also in a variety of other different circumstances, the display system 10 of the present invention further includes at least one actuatable control assembly structured to permit the selective actuation of at least one selectively available interface link. In the preferred embodiment, the selectively available interface link includes both a video link which can control a video play-back assembly and an audio link structured to control an audio play-back assembly. As indicated, these interface links are preferably always selectively available and are preferably structured to become available only when a particular portion of the display being generated by the processor assembly 25 corresponds with and/or calls for a particular interface link. Indeed, along these lines, the selectively available interface link may include an icon, audio-signal or other indicator that such a link is available, with the actuatable control assembly including any of a variety of indicators, such as a voice control, a keyboard 42 or mouse 40 command, or any similar type of indication to initiate operation of the interface link. In the case of the video link, the video play-back assembly may include a separate assembly such as video tape player, video signal receiver or other medium, however, it is preferred that the video playback assembly include the computer and indeed the processor assembly 25 itself such that the video images can be shown directly on the display assembly 20 when it becomes available. As such, as a user moves through a specific real estate space and certain added information may be available, such as through real time video, a user can be prompted to actuate the specific available interface link and view the video image which is stored on the data storage assembly. Likewise, in the case of the audio link, preferably the audio signal is also contained in the data-storage assembly and the audio play-back assembly includes the processor assembly 25 of the display system such that those audio signals may be audibly transmitted through a connected speaker 22. Along these lines, it is often noted that both the video link and audio link may be combined to provide or the video link may itself include a video image having both video and audio at a particular link site. Also, continuous background music, or a narrative and/or automatically triggered audio signal may be provided throughout a display, as desired by a user.

From the foregoing, it is noted that an individual is able to effectively navigate a specific real estate space in an effective, interactive manner which can give the user a substantially close approximation to actual passage through a particular real estate space. Such passage further, is completely interactive and is not limited by the conventions of an ordinary video display, but truly provides an accurate and preferably first person view.

The display system 10 of the present invention as described in its preferred embodiment is preferably structured to be utilized on a completely isolated processor assembly 25, containing all necessary information and operational controls on the data storage assembly, whether it be a chip, a fixed drive or some other removable computer readable medium. In an alternative embodiment, however, the display system 10 of the present invention is further structured to be utilized as part of an interactive, remote, computer interface system 11. Specifically, the interactive remote computer interface system 11 is structured to enable the display system 10 of the present invention to be initiated and operated via a remote, on-line type connection. Typically, individuals at remote user locations are able to interface and access a remote server assembly through a variety of on-line connections, such as conventional telephone lines using a modem or more sophisticated broadband connections. A substantial drawback to such on-line connections, however, is a substantially slow download time associated with downloading even short segments of video, audio or animated graphical displays from the remote server assembly to the local processor assembly. Utilizing the interactive, remote computer interface system of the present invention, the above-described three-dimensional space display system 10 can be effectively utilized through an on-line connection without sacrificing the continuous and substantially seamless maneuvering it provides through various visual images. As such, a user is able to access a "web site" associated with a particular real estate space, and can view the real estate space as desired.

In the preferred embodiment, the interactive, remote computer interface system 11 includes a remote server assembly 50, such as a large mainframe computer or other typical remote server assembly type configuration including one or more computer processors. Furthermore, the remote server assembly 50 is structured to include a quantity of primary site data. In this regard, the primary site data substantially includes operating instructions and information which is to be accessed by an on-line connection. Preferably, however, the remote server assembly 50 includes at least one primary site address. The primary site address includes at least a portion of the primary site data, and is distinct so as to identify its location on a computer network and allow remote access thereto when desired. For example, typical site addresses are URL addresses which are accessible through internet connections and are specific so as to appropriately direct an internet connection and access the primary site address desired by the user on the computer network.

Furthermore, the interface system includes a local processor assembly 25', such as the processor assembly of the display system 10, previously described. The local processor assembly 25' is coupled, preferably through a conventional on-line type connection, iii data transmitting and receiving communication with the remote server assembly 50. Along these lines, that coupled, data transmitting and receiving communication can take on any of a number of configurations such as a conventional telephone line, a dedicated data line, a broadband transmission line, a fiber-optic line, an airwave transmission or any other known or contemplated assembly to provide for data transmitting and receiving communication between two remote sites. As such, the local processor assembly 25' is structured to access the primary site address and thereby achieve the data transmitting and receiving communication with the remote server assembly 50 and especially with the primary site address which contains the primary site data sought to be accessed and interfaced by a user of the local processor assembly 25'.

The local processor assembly 25' further includes at least one data storage assembly associated therewith and structured to contain a quantity of auxiliary site data thereon. Preferably, the auxiliary site data is associated with the primary site data for use in conjunction with one another as will be described in further detail subsequently. Moreover, while the data storage assembly may include a computer hard-drive of the local processor assembly 25', in the preferred embodiment and potentially in addition to the computer hard-drive associated with the local processor assembly 25', the data storage assembly will include a compact, portable and interchangeable computer readable medium 36 and its associated external or internal drive 35, which can be configured to merely read data or to both read and write data. The compact, portable and interchangeable computer readable medium 36 may be a computer disk or any other known computer readable medium, and preferably will include a CD-ROM or DVD medium. Indeed, for reason which will become apparent, it is further preferred that the CD ROM or DVD technology be writable so as to permit further auxiliary site data to be entered thereon. Along these lines, it is specifically noted that DVD technology is ultimately to be preferred because of its substantially greater data storing capabilities in a compact source. Using DVD technology, a substantial quantity of video images, audio signals, processor controls and other data can be contained in an accessible format.

Additionally, the compact, portable, interchangeable computer readable medium 36 also includes a plurality of remotely accessible, auxiliary site addresses encoded thereon. Each of the auxiliary site addresses is preferably distinct so as to identify a particular location on the interchangeable computer readable medium 36 associated with the auxiliary site address and wherein select portions of the quantity of auxiliary site data is included. As such, select portions of the auxiliary site data can be segregated and maintained in a readily accessible, identifiable and located state. Along these lines, the remotely accessible, auxiliary site addresses are preferably structured to be remotely accessed by the remote server assembly 50 in order to initiate utilization of the select portions of the auxiliary site data contained in that auxiliary site address by the local processor assembly. Moreover, interchangeable computer readable medium 36 is preferably structured such that only the remote server assembly 50 can access the auxiliary site data at the auxiliary site addresses. Such a structure ensures the preferred utilization of the auxiliary site data only in conjunction with the primary site data, whether simultaneously or otherwise. Such may be of particular use if the interchangeable computer readable medium 36 is distributed as a free or low cost promotional item to promote visits to a particular web site.

Preferably, the compact, portable interchangeable computer readable medium 36 is structured to contain a plurality of separate and distinct video images, audio signals, graphical displays, etc. and various combinations thereof. Indeed, it is seen that the auxiliary site data contained on the compact, portable and interchangeable computer readable medium 36 primarily includes data types which are substantially difficult to quickly and effectively download from a remote server assembly 50 utilizing conventionally available data transmission systems, and/or data or executable programs which can more conveniently and quickly be maintained and accessed at the local site. As such, a user at the local processor assembly 25' is able to access a particular primary site address or "web site" utilizing normal means so as to interact with the data at the primary site address. When, however, utilization of the primary site address calls for interactive video and/or graphical displays with associated audio, downloading need not take place, but rather the remote server assembly 50 accesses the interchangeable computer readable medium 36 and initiates utilization of the auxiliary site data stored thereon by the local processor assembly 25' so as to significantly enhance the on-line experience with added information, graphical display, and advertising clips, if desired. Also, all of this information is utilized without any excessive download times or the need to download specified drivers and the like. Furthermore, when utilized with the display system 10 of the present invention, the auxiliary site data preferably includes the quantity of data associated with the three-dimensional space being displayed, along with a variety of operating instructions which instruct the local processor assembly 25' regarding the images to be generated from the auxiliary site data.

As indicated, in the preferred embodiment of the present invention, the remotely accessible, auxiliary site addresses are specifically encoded so as to restrict access by the local processor assembly 25' unless the access is directed by the remote server assembly 50. Such encoded restriction thereby prevents a user from utilizing the auxiliary site data unless it is in conjunction with the primary site data and therefore a "visit" to the particular primary site address. Moreover, because various "web searching engines" have built-in security systems to prevent remote server assembly 50 access to the local processor assembly 25', thereby protecting sensitive information contained by the data storage assembly associated with the local processor assembly 25', the interface system 11 of the present invention further includes a security protocol system which limits the remote server assembly's 50 access to the local processor assembly 25'. Specifically, the security protocol system preferably only permits access to the compact portable, interchangeable computer readable medium 36 associated with the local processor assembly 25'. Along these lines, the security protocol system of the preferred embodiment does not permit the remote server assembly 50 to actually access data or access the local processor assembly 25', but rather allows the remote server assembly 50 only to "check" for external devices, such as disk drives 35 and the like until the compact portable, interchangeable computer readable medium 36 containing the appropriate auxiliary site address are present, of course, with more complex security protocol systems, the auxiliary site data present on the interchangeable computer readable medium may be downloaded directly onto a fixed drive of the local processor assembly, or security clearance may be provided to the remote server assembly 50 so as to allow access. Still, however, maintaining the auxiliary site data on the interchangeable computer readable medium 36 is preferred, thereby minimizing space that is taken up by the auxiliary site data on the local processor assembly 25' and associated, permanent data storage assemblies.

I accordance with the previously recited security measures, the interface system 11 preferably includes a specific applet or "cookie" structured to direct the remote server assembly 50 to specifically look for and identify the internal site address of the compact, portable, interchange computer readable medium 36 relative to the local processor assembly 25', so that the auxiliary site addresses thereon can be searched. For example, in a variety of computer systems, a drive which contains the compact portable and interchangeable computer readable medium 36 may have one of a variety of different internal site addresses such as a:, b:, c:, d:, etc. The applet or cookie of the present invention directs the remote server assembly 50 to only look for and identify the internal site address of the interchangeable computer readable medium 36, and not to search any internal site address for specific data or for a specific auxiliary site address. Accordingly, unauthorized access by the remote server assembly 50 onto the data storage assembly of the local processor assembly 25' is prevented. Also, the remote server assembly 50 is preferably structured to signal a non-presence of the compact portable interchangeable computer readable medium 36, such as if an internal sight address for such a medium is located and when accessed no interchangeable computer readable medium 36 is physically present or an incorrect interchangeable computer readable medium is present. Such signaling may take on any conventional form, and may even be accompanied with an order request so that an appropriate interchangeable computer readable medium 36 may be ordered and forwarded to the user for future use in the local processor assembly 25'. Alternatively, the interchangeable computer readable medium itself 36, for example once placed in communication with a local processor assembly 25' can be structured to identify itself and identify its internal site address relative to the local processor assembly 25' so as to facilitate identification thereof by the remote server assembly 50. From the foregoing, it is seen that only once the remote server assembly 50 identifies where it is suppose to look for the interchangeable computer readable medium 36, will any actual access to the auxiliary site data be achieved. Of course, in some circumstances such security measures need not be invoked.

In a preferred embodiment of the interface system 11 of the present invention, the local processor assembly 25' further includes a data entry assembly associated therewith and structured to provide for an input of at least a portion of the auxiliary site data into a corresponding auxiliary site address of the interchangeable computer readable medium 36. In particular, it is understandable that after some period of time, the auxiliary site data contained on a specific interchangeable computer readable medium 36 may become outdated or may otherwise need some sort of updating. While it may be preferred to merely provide a user with a new interchangeable computer readable medium having the updated information, it is also contemplated that in some circumstances, especially where the interchangeable computer readable medium 36 can be written upon, the interchangeable computer readable medium 36 may be effectively updated by the remote server assembly 50 or the user at the local processor assembly 25'. Preferably, the data entry assembly is structured to include a receiver assembly 60 that receives a remotely transmitted signal containing at least some of auxiliary site data from a transmitter assembly 65 for preferably immediate storage on the data storage assembly. The receiver assembly 60 may be connected with the local processor assembly 25' or may be a special dedicated receiver assembly merely associated therewith but into which the interchangeable computer readable medium 36 to be updated is specifically inserted. Of course, it will be preferred for the local processor assembly 25' to be specifically programmed, such as through a specific logic chip, to provide for control of the receiver assembly 65, thereby eliminating the need for excessive, separate and distinct articles which must be incorporated as part of the interface system 11. Along these lines, the remotely transmitted signal may include any of a variety of types of signals such as a full band broadcast signal, an interlaced broadcast signal or any other known data type signal. Furthermore, the remotely transmitted signal may be transmitted to the receiver assembly 60 by a variety of compatible transmitter assemblies 65, such as a satellite transmitter, a radio transmitter, or a cabled transmitter, such as a telephone line, broadband cable, fiber-optic cable and the like, so long as the remotely transmitted signal can be transmitted in substantially complete integrity to the receiver assembly 60. Also, so as to maximize the quantity of the auxiliary site data which can be stored and entered by the data entry assembly onto the interchangeable computer readable medium 36, the interface system 11 also preferably includes a compression assembly that compresses the auxiliary site data into either a usable compressed form, or into a form which can be readily decompressed when actual use is necessitated. Accordingly, it is noted that updating of the auxiliary site data may be continuous, such as while access to the remote server assembly 50 is being attained, or separate as an independent step through any of a variety of data transmitting structures.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An interactive, remote, computer interface system comprising:

a remote server assembly, said remote server assembly including a quantity of primary site data;

said remote server assembly including at least one primary site address, said primary site address including at least a portion of said primary site data and being distinct so as to identify a location thereof on a computer network;

a local processor assembly;

said local processor assembly being coupled in data transmitting and receiving communication with said remote server assembly;

said local processor assembly being structured to access said primary site address so as to achieve said data transmitting and receiving communication with said remote server assembly;

at least one data storage assembly associated with said local processor assembly and structured to contain a quantity of auxiliary site data thereon, said auxiliary site data being associated with said primary site data;

said data storage assembly including a compact, portable and interchangeable computer readable medium;

said compact, portable and interchangeable computer readable medium including a plurality of remotely accessible, auxiliary site addresses encoded therein, each of said remotely accessible, auxiliary site addresses including select portions of said quantity of auxiliary site data; and said remotely accessible, auxiliary site addresses being structured to be remotely accessed by said remote server assembly so as to initiate utilization of said select portions of said quantity of auxiliary site data by said local processor assembly in conjunction with said primary site data.

2. A system as recited in claim 1 wherein said remotely accessible auxiliary site addresses are encoded so as to restrict access by said local processor assembly unless said access is directed by said remote server assembly.

3. A system as recited in claim 1 further including a security protocol system, said security protocol system being structured to limit said remote server assembly's access to said local processor assembly by only permitting access to said compact, portable, interchangeable computer readable medium associated with said local processor assembly.

4. A system as recited in claim 1 wherein said remote server assembly is structured internal site and identify an internal site address of said compact, portable and interchangeable computer readable medium relative to said local processor assembly.

5. A system as recited in claim 4 wherein said remote server assembly is structured to signal a non-presence of said compact, portable and interchangeable computer readable medium.

6. A system as recited in claim 1 wherein said compact, portable and interchangeable computer readable medium is structured to identify an internal site address thereof relative to said local processor assembly, thereby facilitating access thereto by said remote server assembly.

7. A system as recited in claim 1 wherein said compact, portable and interchangeable computer readable medium is structured to store at least one video image.

8. A system as recited in claim 1 wherein said compact, portable and interchangeable computer readable medium is structured to store at least one audio signal.

9. A system as recited in claim 1 wherein said primary and said remotely accessible auxiliary site addresses include URL addresses accessible through an online connection.

10. A system as recited in claim 1 wherein said local processor assembly further includes a data entry assembly associated therewith and structured to provide for an input of at least a portion of said auxiliary site data into a corresponding one of said auxiliary site addresses of said compact, portable and interchangeable computer readable medium.

11. A system as recited in claim 10 further including a compression assembly structured to compress said auxiliary site data inputted by said data entry assembly onto said compact, portable and interchangeable computer readable medium.

12. A system as recited in claim 10 wherein said data entry assembly includes a receiver assembly structured to receive a remotely transmitted signal containing at least some of said auxiliary site data.

13. A system as recited in claim 12 wherein said remotely transmitted signal includes a full band broadcast signal.

14. A system as recited in claim 12 wherein said remotely transmitted signal includes an interlaced broadcast signal.

15. A system as recited in claim 12 wherein said remotely transmitted signal is transmitted to said receiver assembly by a satellite transmitter.

16. A system as recited in claim 12 wherein said remotely transmitted signal is transmitted to said receiver assembly by a radio transmitter.

17. A system as recited in claim 12 wherein said remotely transmitted signal is transmitted to said receiver assembly by a cabled transmitter.

18. A system as recited in claim 17 wherein said cabled transmitter includes a telephone line.

19. A system as recited in claim 17 wherein said cabled transmitter includes a broadband cable.

20. A system as recited in claim 17 wherein said cabled transmitter includes a fiber optic cable.

21. A system as recited in claim 1 wherein said compact, portable and interchangeable computer readable medium is structured to store a plurality of operating instructions which direct an operation of said local processor assembly.

22. A system as recited in claim 21 wherein said local processor assembly includes an overlay processor and a direct view processor;

said operating instructions on said compact, portable and interchangeable computer readable medium are structured to direct said overlay processor to generate a floor plan display of a three dimensional space at least partially from said quantity of auxiliary site data; and said operating instructions on said compact, portable and interchangeable computer readable medium are structured to direct said direct view processor to generate a three dimensional, walk through display of the three dimensional space at least partially from said quantity of auxiliary site data.

\* \* \* \* \*

(12) EX PARTE REEXAMINATION CERTIFICATE (8354th)
United States Patent
Rothschild (10) Number: US 6,101,534 C1
(45) Certificate Issued: Jun. 28, 2011

(54) INTERACTIVE, REMOTE, COMPUTER INTERFACE SYSTEM (75) Inventor: Leigh M. Rothschild, Miami, FL (US)

(73) Assignee: LMR Inventions, LLC

Reexamination Request:
No. 90/008,591, Apr. 11, 2007

Reexamination Certificate for:
| | |
|---|---|
| Patent No.: | 6,101,534 |
| Issued: | Aug. 8, 2000 |
| Appl. No.: | 08/922,926 |
| Filed: | Sep. 3, 1997 |

(51) Int. Cl.
| | |
|---|---|
| *G06F 15/16* | (2006.01) |
| *G06F 15/173* | (2006.01) |
| *G06F 13/38* | (2006.01) |
| *G06F 15/17* | (2006.01) |
| *H04M 3/493* | (2006.01) |
| *H04M 3/487* | (2006.01) |

(52) U.S. Cl. .................. 709/217; 709/219; 709/225; 709/229

(58) Field of Classification Search ................... None
See application file for complete search history.

(56) References Cited

U.S. PATENT DOCUMENTS

| | | | |
|---|---|---|---|
| 5,555,407 A | | 9/1996 | Cloutier |
| 5,857,187 A | | 1/1999 | Uenoyama |
| 5,892,825 A | | 4/1999 | Mages |
| 5,915,093 A | | 6/1999 | Berlin et al. |
| 5,931,906 A | * | 8/1999 | Fidelibus et al. ............ 709/217 |
| 5,937,158 A | | 8/1999 | Uranaka |
| 5,996,000 A | | 11/1999 | Shuster |
| 6,145,088 A | | 11/2000 | Stevens |
| 6,594,692 B1 | | 7/2003 | Reisman |

OTHER PUBLICATIONS

Citrix Winview For Networks Installation Guide. Citrix Systems, Inc. 1990. Version WV.2.3.emj.

Reisman, Richard R. "Raising a Bumper Crop of CD–ROM hybrids." Mass High Tech. Mass Tech Times, Inc. Boston, MA: Sep. 2, 1996. vol. 14, No. 29, p. 17.

Britton, Mike & Van Cleve, Suzanne. "Discover Desktop Conferencing with Netmeeting 2.0." IDG Books Worldwide, Inc. 1997.

Takahashi, Dean. "A New Medium—The Bridge Solution: CD–Roms help give the illusion that the PC has No limits . . . " The Wall Street Journal. Dow Jones & Co. Mar. 20, 1997.

Ladd, Eric. "The Document Tags." Oct. 23, 2006. <http://www.sunsite.serc.iisc.ernet.in/virlib/html/platinum/ch4.htm>.

(Continued)

*Primary Examiner* — William H. Wood (57) ABSTRACT

An interactive, remote, computer interface system having a remote server assembly including a quantity of primary site data and at least one primary site address that contains at least a portion of the primary site data and is distinct so as to identify a location thereof on a computer network. The system further includes a local processor assembly coupled in data transmitting and receiving communication with the remote server assembly and structured to access the primary site address so as to achieve the data transmitting and receiving communication with the remote server assembly. At least one data storage assembly is associated with the local processor assembly and contains a quantity of auxiliary site data thereon, the auxiliary site data being associated with the primary site data. Further the data storage assembly including a compact, portable and interchangeable computer readable medium having a plurality of remotely accessible, auxiliary site addresses encoded therein, each of said remotely accessible, auxiliary site addresses including select portions of the quantity of auxiliary site data, and being structured to be remotely accessed by the remote server assembly so as to initiate utilization of select portions of the auxiliary site data by the local processor assembly in conjunction with the primary site data.

OTHER PUBLICATIONS

Creative Wonders/Electronic Arts. "ABC News Links—from CD–ROM Access." Aug. 17, 2007. <http://www.cdaccess.com/html/pc/abcnews.htm>.

Krushenisky, Cindy. "Reference Resources That Make The Best Reports Even Better." Smart Computing. Aug. 17, 2007. <http://www.smartcomputing.com>.

Iqbal, M.S. & Poon, F.S.F, "A Simplified & an Efficient Packet Level Internet Access Control Scheme." Ethertech Conslt Ltd., U.K. 1992.

Heylighen, Francis, "World Wide Web: a distributed hypermedia paradigm for global networking." Share Europe Spring Conference, pp. 355–368. Brussels, Belgium. Apr. 1994.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 3-21 is confirmed.

Claim 2 is cancelled.

New claims 23 and 24 are added and determined to be patentable.

Claim 22 was not reexamined.

23. *An interactive, remote, computer interface system comprising:*
  *a remote server assembly, said remote server assembly including a quantity of primary site data;*
  *said remote server assembly including at least one primary site address, said primary site address including at least a portion of said primary site data and being distinct so as to identify a location thereof on a computer network;*
  *a local processor assembly;*
  *said local processor assembly being coupled in data transmitting and receiving communication with said remote server assembly;*
  *said local processor assembly being structured to access said primary site address so as to achieve said data transmitting and receiving communication with said remote server assembly;*
  *at least one compact portable and interchangeable computer readable medium associated with said local processor assembly and structured to contain a quantity of auxiliary site data thereon, said auxiliary site data being associated with said primary site data;*
  *said compact, portable and interchangeable computer readable medium being distinct from a fixed hard drive of said local processor assembly;*
  *said compact, portable and interchangeable computer readable medium including a plurality of remotely accessible, auxiliary site addresses encoded therein, each of said remotely accessible, auxiliary site addresses including select portions of said quantity of auxiliary site data;*
  *said remotely accessible, auxiliary site addresses being structured to be remotely accessed by said remote server assembly;*
  *said remote server assembly remotely accessing said auxiliary site data to initiate utilization of said select portions of said quantity of auxiliary site data by said local processor assembly;*
  *said select portions of said quantity of auxiliary site data utilized in conjunction with said primary site data; and*
  *said select portions of said quantity of auxiliary site data at the auxiliary site addresses accessible only while the local processor assembly is interactively online connected to the remote server assembly.*

24. *An interactive, remote, computer interface system comprising:*
  *a remote server assembly, said remote server assembly including a quantity of primary site data;*
  *said remote server assembly including at least one primary site address, said primary site address including at least a portion of said primary site data and being distinct so as to identify a location thereof on a computer network;*
  *a local processor assembly;*
  *said local processor assembly being coupled in data transmitting and receiving communication with said remote server assembly;*
  *said local processor assembly being structured to access said primary site address so as to achieve said data transmitting and receiving communication with said remote server assembly;*
  *at least one data storage assembly associated with said local processor assembly and structured to contain a quantity of auxiliary site data thereon, said auxiliary site data being associated with said primary site data;*
  *said data storage assembly including a compact, portable and interchangeable computer readable medium;*
  *said compact, portable and interchangeable computer readable medium including a plurality of remotely accessible, auxiliary site addresses encoded therein, each of said remotely accessible, auxiliary site addresses including select portions of said quantity of auxiliary site data;*
  *said remotely accessible, auxiliary site addresses being structured to be remotely accessed by said remote server assembly;*
  *said remote server assembly remotely accessing said auxiliary site data to initiate utilization of said select portions of said quantity of auxiliary site data by said local processor assembly;*
  *said select portions of said quantity of auxiliary site data utilized in conjunction with said primary site data;*
  *said remotely accessible auxiliary site addresses being encoded so as to restrict access by said local processor assembly unless said access is directed by said remote server assembly; and*
  *said select portions of said quantity of auxiliary site data at the auxiliary site addresses accessible only while the local processor assembly is interactively online connected to the remote server assembly.*

\* \* \* \* \*